T. DECHNIK.
DRILL CHUCK.
APPLICATION FILED OCT. 17, 1912.
1,075,699. Patented Oct. 14, 1913.
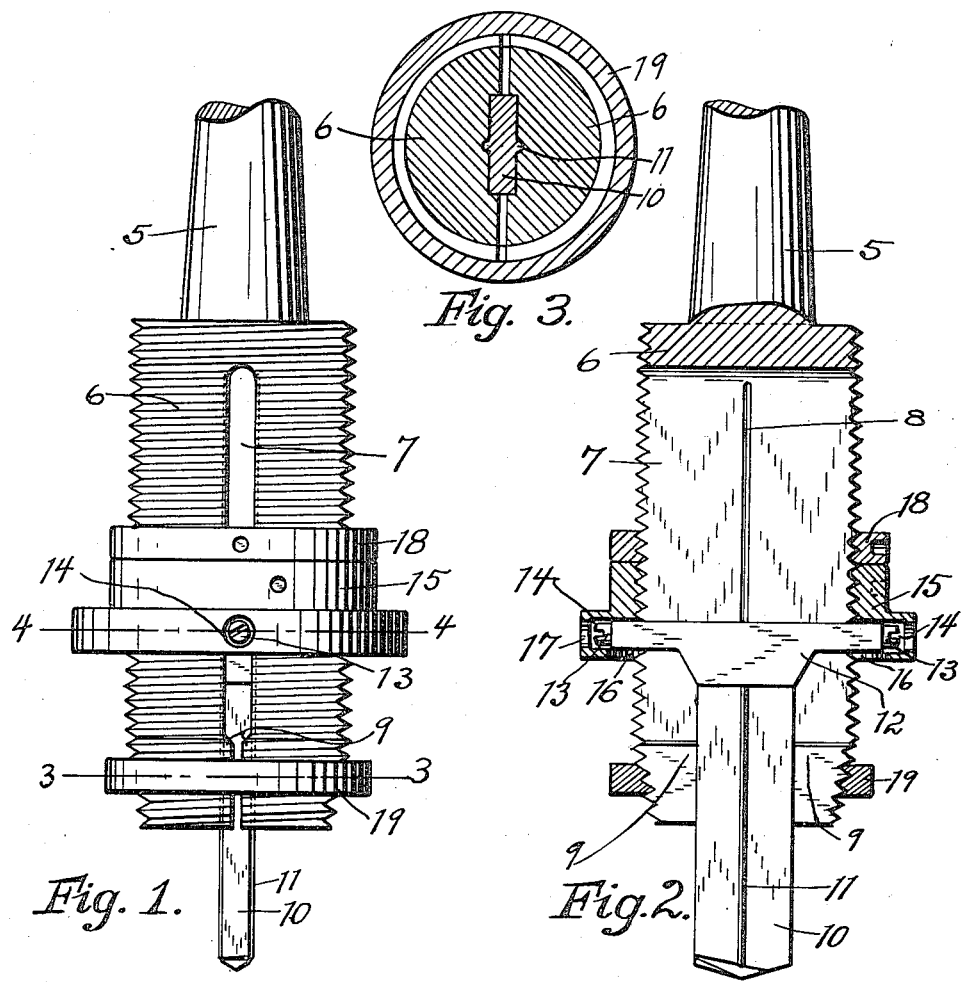
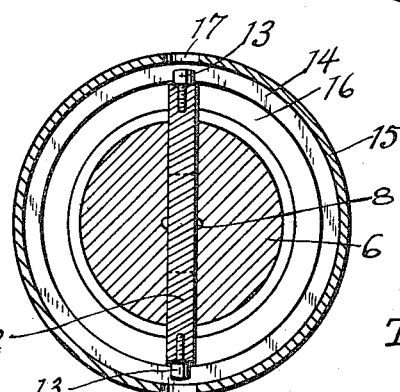
Witnesses:
T. Colson,
E. E. Wessels.
Inventor:
Thomas Dechnik.
By Joshua R. H. Potts
his Attorney.

UNITED STATES PATENT OFFICE.

THOMAS DECHNIK, OF SOUTH CHICAGO, ILLINOIS.

DRILL-CHUCK.

1,075,699. Specification of Letters Patent. Patented Oct. 14, 1913.

Application filed October 17, 1912. Serial No. 726,222.

*To all whom it may concern:*

Be it known that I, THOMAS DECHNIK, a citizen of the United States, and a resident of the city of South Chicago, county of Cook, and State of Illinois, have invented certain new and useful Improvements in Drill-Chucks, of which the following is a specification.

My invention relates to drill chucks and the object of this improvement is to provide a device of this character which will be adapted to hold drills until they are used up to a very short length.

A further object is to produce a device of this character which will be simple of construction and efficient in its operation.

Other objects will appear hereinafter.

With these objects in view, the invention consists in the combinations and arrangements of parts hereinafter described and claimed.

The invention will be best understood by reference to the accompanying drawings forming a part of this specification and in which, Figure 1 is an elevation of a device embodying my invention, Fig. 2 is a vertical section of the same, Fig. 3 is a section taken on line 3—3 of Fig. 1, and Fig. 4 is a section taken on line 4—4 of Fig. 1.

The preferred form of construction, as illustrated in the drawings, comprises a shank 5 of ordinary construction having a tubular body 6 rigidly secured thereon or formed integrally therewith. Said body 6 is provided with a longitudinally extending slot 7 and longitudinal grooves 8 on the inner sides of said slot, substantially as indicated. At the lower open end of the slot, are formed shoulders 9, which facilitate the supporting of the drill 10 at the lower end of the chuck. The drill 10, in this construction, is preferably that which is indicated in the drawings and provided with beads 11 engaging the alining slots 8. When the drill is of longer length and reaches to the top of the slot 7, the grooves 8, co-acting with the beads 11, serve to maintain the drill 10 in alining position in the chuck and when the drill is of short length, such as indicated in Figs. 1 and 2, a backing member 12 is provided to prevent longitudinal movement of the drill up into the chuck when the drill engages work at its point and the shoulders 9 engaging the edges of the drill, further reinforce the supporting of the drill in the chuck.

The backing member 12 is provided with perforations in its end portions and screws 13 threaded therein. The end portions of the member 12 extend into an annular groove 14 in the nut 15. The member 12 is inserted in the annular groove 13 through the opening 16 in the lower side of the nut 15 and is maintained in said groove by means of the screws 13 which prevent the end portions of the member 12 from moving downwardly through the opening 16, by contacting the lower side of the groove 13. When it is desired to remove the member 12 from the nut 15, screws 13 are taken from their engaging recesses through the perforations 17 in the nut 15, allowing the member 12 to slide downwardly out of the nut. A lock nut 18 is also threaded on the body portion 6, and adapted to engage the nut 15 to lock it securely on the body 6 to maintain the member 12 at different heights in the slot 7.

A clamping nut 19 is threaded on the tapering portion of the member 6 to clamp the drill between the lower free ends of the member 6, as will be readily understood.

In operation the drill is inserted in the slot 7 with its beads 11 in the grooves 8 and clamped therein by means of nut 19. Upon the drill being worn away by usage and sharpening, it becomes shorter and when of a length which cannot be readily used in the chuck, the member 12 is inserted in the slot 7, as clearly illustrated, and secured from longitudinal movement in said slot by means of the nut 15 and locking nut 18, as described. With the use of this backing member 12 a drill may be used until a very short portion remains.

While I have illustrated and described the preferred form of construction for carrying my invention into effect, this is capable of variation and modification without departing from the spirit of the invention. I, therefore, do not wish to be limited to the precise details set forth, but desire to avail myself of such variations and modifications as come within the scope of the appended claim.

Having described my invention, what I claim as new and desire to secure by Letters Patent is:

In combination, a shank having a longitudinal slot therein and tapering threads on its lower end; a drill in said slot, said drill being rectangular in cross section and of a thickness to snugly fit the sides of said slot; integrally formed shoulders on said shank in the lower end of said slot engaging the edges of said drill; and a collar threaded on the tapered threads of said shank removably securing said drill in said slot, substantially as described.

In testimony whereof I have signed my name to this specification in the presence of two subscribing witnesses.

THOMAS DECHNIK.

Witnesses:
 A. A. OLSON,
 JOSHUA R. H. POTTS.

Copies of this patent may be obtained for five cents each, by addressing the "Commissioner of Patents, Washington, D. C."